(12) United States Patent
Ozkan

(10) Patent No.: US 10,262,274 B2
(45) Date of Patent: Apr. 16, 2019

(54) INCREMENTAL LEARNER VIA AN ADAPTIVE MIXTURE OF WEAK LEARNERS DISTRIBUTED ON A NON-RIGID BINARY TREE

(71) Applicant: ASELSAN ELEKTRONIK SANAYI VE TICARET ANONIM SIRKETI, Ankara (TR)

(72) Inventor: Hüseyin Ozkan, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 576 days.

(21) Appl. No.: 14/906,904

(22) PCT Filed: Jul. 22, 2013

(86) PCT No.: PCT/IB2013/056009
§ 371 (c)(1),
(2) Date: Jan. 22, 2016

(87) PCT Pub. No.: WO2015/011521
PCT Pub. Date: Jan. 29, 2015

(65) Prior Publication Data
US 2016/0189058 A1   Jun. 30, 2016

(51) Int. Cl.
*G06N 20/00*   (2019.01)
*G06N 5/04*    (2006.01)
*G06N 5/00*    (2006.01)

(52) U.S. Cl.
CPC ............. *G06N 20/00* (2019.01); *G06N 5/00* (2013.01); *G06N 5/045* (2013.01)

(58) Field of Classification Search
CPC .......... G06N 99/005; G06N 5/00; G06N 5/045
See application file for complete search history.

(56) References Cited

U.S. PATENT DOCUMENTS

| 5,799,311 A | 8/1998 | Agrawal et al. |
| 6,269,353 B1 * | 7/2001 | Sethi .................... G06K 9/6282 706/20 |

(Continued)

OTHER PUBLICATIONS

Huseyin Ozkan et al "Competitive and Online Piecewise Linear Classification" Acoustics Speech and Signal Processing.(Jun. 13, 2013), pp. 3452-3456.

(Continued)

*Primary Examiner* — Eric Nilsson
*Assistant Examiner* — Brent Johnston Hoover
(74) *Attorney, Agent, or Firm* — Gokalp Bayramoglu

(57) ABSTRACT

The present invention relates to a method for incremental learning of a classification model, where pre-defined weak incremental learners are distributed over the distinct regions in a set of partitionings of the input domain. The partitionings and regions are organized via a binary tree and they are allowed to vary in a data-driven way, i.e., in a way to minimize the classification error rate. Moreover, to test a given data point, a mixture of decisions is obtained through the models learned in the regions that this point falls in. Hence, naturally, in the cold start phase of the data stream, the simpler models belonging to the larger regions are favored and as more data get available, the invention automatically puts more weights on the more complex models.

2 Claims, 2 Drawing Sheets

(56) References Cited

U.S. PATENT DOCUMENTS

2005/0246307 A1 11/2005 Bala
2014/0052674 A1* 2/2014 Aggarwal ............ G06N 99/005
706/12

OTHER PUBLICATIONS

Joseph Wang et al "Local Supervised Learning through Space Partitioning" Neutral information Processing Systems (2012).
Freund Yoav et al "Large Margin Classification Using the Algorithm." Machine Learning.(1999),vol. 37 (3) , pp. 277-296.
Jose Luis Polo et al "Weighed Classification Using Decison Trees for Binary Classification Problems", V Taller de Mineria de Datos y Aprendizaje (Dec. 31, 2007).

* cited by examiner

INCREMENTAL LEARNER VIA AN ADAPTIVE MIXTURE OF WEAK LEARNERS DISTRIBUTED ON A NON-RIGID BINARY TREE

FIELD OF THE INVENTION

The present invention relates to a method for incrementally learning a classification model for a large amount of labeled data being streamed in real time, which is based on an adaptive mixture of weak learners distributed on a non-rigid binary tree.

BACKGROUND OF THE INVENTION

In a wide variety of applications ranging from visual target tracking to speech recognition, binary or multi-class classification problems are frequently encountered and used as one of the building blocks. In most of these problems, a need for processing large amount of data that are continuously streamed naturally arises. To this end, the incremental learning (or update) of a classification model in those problems is almost unavoidable. The incremental learners are naturally to be, computationally simple, capable of handling the complex separations in the data and quickly adaptive to the possible variations in the source statistics such as the appearance changes of a target being tracked. The method in this invention achieves these goals.

It should be first emphasized that the incremental learner of the method in this invention is based on a set (in the course of the input data stream) of varying partitionings of the observation space, i.e., the partitionings are tuned to the observed data in a way to minimize the classification or regression error, and locating a local classifier on each distinct region of the partitionings. This set of varying partitionings and the corresponding local classifiers are organized via a binary tree. Our method accepts a data stream to process via pushing one more data point to the tree at every time step. To test a data point, considering all the regions defined by the partitionings at the corresponding time step, the classification results of the local classifiers in the regions that this data point falls in are specially combined, i.e., weighted and summed, to obtain the final classification. Here, the local classifiers, the weights of the combinations and the generation of the aforementioned set of partitioning are incrementally updated to lower the empirical classification error at each step.

The most relevant designs (Ozkan et al.), (Wang et al.) to this method in the corresponding literature exploit the idea of using localized classifiers to a limited degree. In a recent conference proceeding (Wang et al.), a rejection cascade of classifiers is designed for classification problems in the batch processing setting, where the nodes of that cascade design correspond to a region in the space of observations. These regions and the partitioning structure that is resulted are adjusted given a batch of data iteratively. No results or extension for incremental processing are provided. Furthermore, the cascade structure in that method is a very simple one and a natural extension via balanced trees is not mentioned. Also, their local classifiers are located at the deep leaf nodes, which create an immediate weakness when there is not sufficiently available data since the amount of data to populate the regions in the leaf nodes increases exponentially with the data dimensionality. This is the very case at the beginning of a data stream in high dimension in the sequential setting, which is handled by the adaptive mixtures in this method.

In another design (Ozkan et al.), (1) the authors also exploit the idea of space partitionings. However, the set of partitioning in their method is basically based on listing all possible partitionings (up to certain region granularity) and it is fixed in the course of the data stream. This adversarially affects the adaptiveness of the corresponding incremental learner since in high dimension listing the all possible partitioning up to an arbitrary granularity is not feasible. (2) The authors (Ozkan et al.) also make use of the combination of some local classifiers, which are a simplified version of LDA classifiers in that case. However, the combination they use does not directly target at minimizing the classification accuracy, which clearly sacrifices from the classification accuracy. Moreover, LDA's are not originally designed for incremental learning. Although there exist several incremental versions of LDAs, the updates usually are more complicated compared to a perhaps more natural choice of perceptrons.

The United States patent publication numbered U.S. Pat. No. 5,799,311 A discloses a method for generating a decision-tree classifier from a training set of records, independent of the system memory size. In this invention, each node split is determined based on only one attribute using an appropriate criterion such as the Gini index. Also each split is determined once only and then it is fixed. Clearly, the method disclosed in U.S. Pat. No. 5,799,311 A is not appropriate for sequential processing. Moreover, the corresponding partitioning is fixed and no mixture of experts type of an approach is used to handle the case of insufficient number of available data points.

The United States patent publication numbered US20050246307 A1 discloses a method for "employing a hybrid Bayesian decision tree for classification", which has the capability of incrementally updating classification trees. The decision trees of this patent have one attribute evaluation only at each node. Moreover, the incremental learning in that context only means to create a new tree for some synthetic data points for which no tree model is existent as opposed to incrementally adjusting one existing tree structure.

The United States patent publication numbered U.S. Pat. No. 6,269,353 B1 discloses a method for constructing decision trees, which learns multi-feature splits at the nodes of a decision tree using a neural network. This method does not target the case of sequential processing since it assumes the availability of a training set in advance. Hence, it does not have the capability of updating the structure of the decision tree on demand incrementally. No comment is made regarding the computational complexity, however our method processes every data point once only and does not store. Our method also uses a mixture of experts idea to handle the sparse data, which is an important cold start problem at the beginning of a data stream in the sequential setting. Our mixture of experts implementation favors simpler model trained with all available data points at the beginning and starts favoring more complex models as more data are streamed.

In general, the existing work and inventions regarding the incremental updates of decision trees have common drawbacks: (1) the split at each node of the tree is usually single attribute based, (2) the split criterion is usually based on class label purities such as the Gini index. In our invention, we take a rather radical approach, which considers the split as a separate binary classification model and operates sequentially, i.e., the classification model for each split is learned incrementally.

SUMMARY OF THE INVENTION

Our invention is capable of processing billions of data (such as feature vectors extracted from video frames) continuously, i.e., with no interrupt, and with incremental updates of a very low memory requirement and very high speed.

The three main blocks of our invention (learning of the regions classifiers, learning the combinations and learning the space partitionings) are all data-driven and directly target at minimizing of the empirical classification error rate.

The computational complexity of these updates is independent with the size of data to be processed; hence the method is highly scalable with the data size.

The method also incrementally learns the space partitioning to distribute the local classifiers, which removes the necessity to list the all possible partitioning for a "good enough" classification. As a result, the method is highly scalable with the data dimensionality.

The non-linear class separations are approximated via piece-wise linear boundaries incrementally, hence the method has high fitting capability.

The proposed method is robust to over-fitting, since the local classifiers are linear classifiers, which are of finite "VC" dimensionality.

The changes in the data source statistics are adaptively learnt and registered.

Moreover, our method is robust to the noise in data, since the weighted combination of perceptrons provides a soft classification decision.

BRIEF DESCRIPTION OF THE DRAWINGS

A method for incremental learning in order to fulfill the objects of the present invention is illustrated in the attached figures, where.

Figure 1:
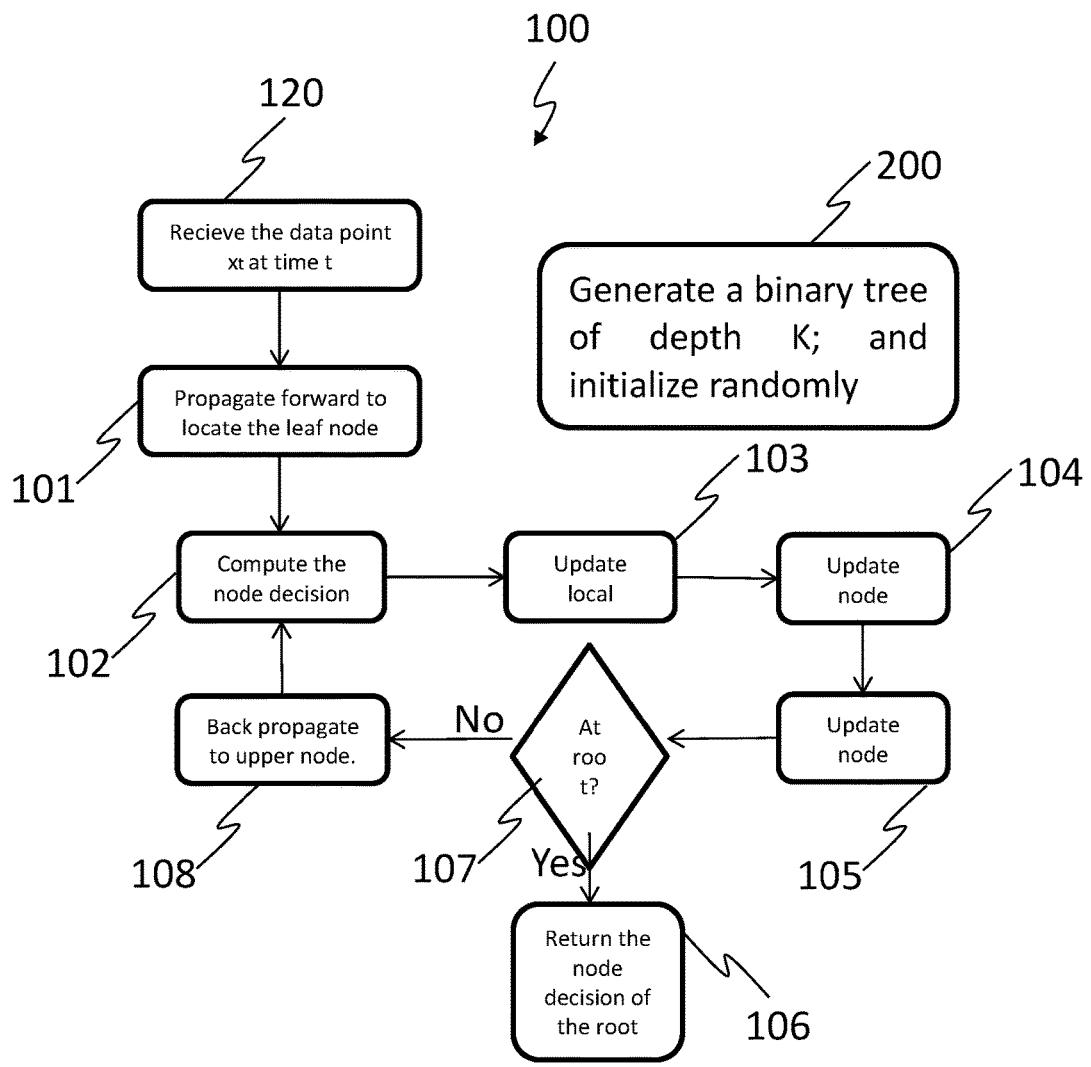
FIG. 1 is a schematic of the flowchart of the method.
Figure 2:
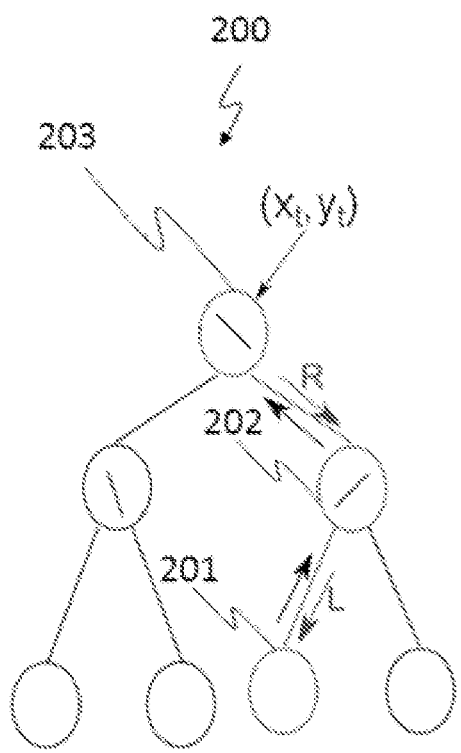
FIG. 2 is a schematic of the flowchart on the binary decision tree corresponding to a data point to be processed.

200. Binary tree
201. Corresponding leaf node
202. A corresponding intermediate node
203. Root node

DETAILED DESCRIPTION OF THE INVENTION

A method for incremental learning (100) fundamentally comprises the steps of;
  receiving the data point xt at time t (120),
  propagating forward on the decision tree to locate the leaf node (101),
  computing the node decision by computing first the local decision at the node, then computing the node decision, if this node is non-leaf, as the weighted sum of the local decision and the node decision of the corresponding child; if this node is the leaf, as the local decision (102),
  updating the local classification model (103),
  updating the node classification model, i.e., the weighting coefficients (104),
  updating the node partitioning model (105),
  if this is not a root node, back propagating to the upper parent (108) and going to step 102, otherwise, returning this node decision as the class label predict (106)

The method in this invention, the incremental learner, takes the instances of a data stream $\{x_t, y_t\}$, $x_t \in R^d$, $y_t \in \{1,-1\}$ as the input, where d is the input dimensionality, $x_t$ is the data point and $y_t$ is the corresponding label. Here, the data point, for an instance, might be the feature vector for a visual target in a real time classification based target tracking application. At a time instant in the course of the data stream, first the data input is provided, then the corresponding decision regarding the class label is made; finally, the true class label is revealed and the classification model is updated. In the following, we first describe the classification model at a time instant; and then the details of the incremental update of the model are explained.

Our method operates on a binary tree (200), each node of which corresponds to a partition classifier $v_p$, a local linear classifier $v_c$, and a weighting coefficient vector W to generate a node classifier. At a time instant t for the input data point $x_t$ (100), a path from the root node to a leaf node is chosen (101). Namely, at the root node (203), it is checked if $v_p^T x_t > 0$, then the right child node is chosen (202) and included in the corresponding path, and otherwise, the left child is chosen (201) and included. We here emphasize that for notational simplicity, we do not explicitly show the dependency of the variables of our method on the corresponding node in the tree and time. This will be clear from the context throughout this document.

At the leaf node after tracing this path to the very end (201), the local classification is obtained as $\lambda_c = v_c^T x_t$. Since is a leaf node, the node classification is the same as the local classification (102). Starting from this leaf node, it is backtracked (108) up to the root node.

On this bottom-to-up path, at an intermediate node, i.e., non-leaf node, (202) the local classification is obtained as $\lambda_c = v_c^T x_t$, whereas the node classification is obtained as $\lambda_n = w^T(\lambda_c, \lambda_t')^T$ (102). Here, $\lambda_n'$ is the node decision coming from corresponding child node, and w is the weighting vector at this node at the corresponding time instant.

Then, the decision for the data input $x_t$ is obtained as the node decision at the root node (106), $\hat{y}_t = \text{sign}(\lambda_n)$, where $\lambda_n$ is the node decision at the root.

We here point out that we calculate the local decisions as soft decisions, i.e., they are not discrete values except that at the root node, we enforce a hard decision by taking the sign of the corresponding node decision. After the data point $x_t$ is observed and its class label is predicted, then the corresponding true class label $y_t$ is revealed, and the incremental update of our classification model is performed. We adapt the voted perceptrons (Freund, 1999) for the incremental learning scheme in this method. However, we strongly emphasize that these classifiers can be chosen as one of the many existing incremental linear classifiers. Here, we use voted perceptrons for their conceptual simplicity. In the following, we describe how we adapt them. For a given data point $x_t$, the leaf node is first located on the binary tree (101).

Then at the leaf node (201), the local classifier is updated with $(x_t, y_t)$ (103). Supposing that the number of data points up to the time t−1 at this leaf node is N−1; the local linear classifier is updated as $$v_c \leftarrow ((N-1)v_c + \mu h_t)/N,$$

where μ is the learning rate and $h_t$ is the sequence of linear separators learnt as follows: At a time t, we set $h_t = h_{t-1} + (y_t - h_{t-1}^T x_t)x_t$, where $h_0$ is set randomly (200). Note that there is no weighting or further splitting at a leaf node.

At an intermediate node, i.e., non-leaf node, the local classifier is updated precisely as same as the update rule given for the leaf node. To update the weighting coefficients, i.e., to update the node decision rule (104), we simply treat the weighting vector w as if it is a linear separator in the domain of the 2 dimensional (or 3 dimensional together with the bias term of the separators) observations of the local decisions and the node decision of the corresponding child. Namely, in addition to the data input $x_t$, note that an intermediate node also observes $(\lambda_c, \lambda_n')$, i.e., the pair of updated local decision and the updated node decision of the corresponding child node. With this input $(\lambda_c, \lambda_n')$, we associate the class label $y_t$. Then in this method, the weighting vector $^W$ behaves as the linear separator for the observations $((\lambda_c, \lambda_n'), y_t)$. Here, we again use the voted perceptrons to update the weighting vector.

To update the partitioning (105), i.e., the variable $v_p$ which decides the corresponding child node to pass the input point, $v_p$ is considered as a linear separator in the domain of the data points. Let us name what the node decision would be if the other child were chosen, name it as "hypothetical node decision", and name the decision resulted from the realized path as "realized node decision". If the hypothetical node decision is 'better' than the realized node decision, i.e., if the hypothetical node decision is closer to the label $y_t$ compared to the realized node decision, then update the node partitioning vector $v_p$, as if the data point $x_t$ is classified with $v_p$ wrong. Otherwise, update the node partitioning vector $v_p$, as if the data point $x_t$ is classified with $v_p$ correct. This update process is similar to the updating of local classifier update except that at every step, the learning rate must be sufficiently smaller than the magnitude of $v_p$ to prevent disturbing the classifiers at the lower levels of the tree too much. For that, we choose the learning rate as a small fraction of the magnitude of $v_p$. Namely, $$v_p \leftarrow ((N-1)v_p + \mu h_t)/N$$

where $\mu$ is the learning rate and $h_t$ is the sequence of linear separators learnt by the typical perceptron (Freund, 1999). $h_0$ is set randomly (200). At a time t, we set $h_t = h_{t-1} - \text{sign}(h_{t-1}^T x_t)x_t$, if hypothetical node decision is 'better', $h_t = h_{t-1}$, otherwise.

Note that there is no weighting or further splitting at a leaf node.

Despite that the testing and updating procedures are explained above as two separate operations, they can be readily completed through one pass, i.e., the back-propagation from the leaf node to the root node (100). At every step, first the node decisions are computed and then the models are updated up until the root node is reached (107).

Finally, we note that the computational complexity of the invention is O(K) in the test phase, and O(2^K) in the update phase, where K is the depth of the decision tree.

The invention claimed is:

1. A method for incremental learning for a data point at any time, wherein the method comprises the steps of:
   receiving the data point;
   propagating forward on a decision tree to locate a leaf node, wherein the decision tree is a binary tree; wherein, each node of the decision tree corresponds to a partition classifier $v_p$, a local linear classifier $v_c$, and a weighting coefficient vector w to generate a node classification model;
   computing a node decision by:
   first computing a local decision at a node;
   then if the node is a non-leaf node, computing the node decision as a weighted sum of the local decision and a node decision of a first child node of the non-leaf node;
      if the node is a leaf, computing the node decision as the local decision;
      wherein, the local decision is obtained as $\Delta_c = v_c^T x_t$, where $x_t$ is the data point;
      wherein, for the non-leaf node, the node decision is obtained as
      $\Delta n = w^t (\Delta_c, \Delta_n')^T$, where $\Delta_n'$ is the node decision of the first child node of the non-leaf node, and w is a weighting vector at the first child node;
   updating a local classification model;
   updating the node classification model, by updating weighting coefficient vectors of the node classification model;
   updating a node partitioning model; if the node is not a root node,
   back propagating to a parent node of the node and computing the node decision, otherwise,
   returning a sign of the node decision as a class label prediction.

2. The method for incremental learning of claim 1, wherein for a given non-leaf node on the decision tree in a root-to-leaf path of a given data point $x_t$, updating a node partitioning model comprises sub steps of: computing a hypothetical node decision by selecting a second child node of the node; if the hypothetical node decision is closer to an initial node label than the node decision, then updating the node partitioning vector $v_p$, as if the data point $x_t$ is classified with "$v_p$ wrong", otherwise, updating the node partitioning vector $v_p$, as if the data point $x_t$ is classified with "$v_p$ correct".

* * * * *